(12) United States Patent
Riebe et al.

(10) Patent No.: US 12,320,726 B2
(45) Date of Patent: Jun. 3, 2025

(54) METHOD AND DEVICE FOR DETERMINING A DAMAGE STATE OF COMPONENTS

(71) Applicant: ESTINO GmbH, Eschwege (DE)

(72) Inventors: Jakob Riebe, Dresden (DE); Andreas Griesing, Dresden (DE); Sebastian Langer, Dresden (DE)

(73) Assignee: ESTINO GMBH, Eschwege (DE)

( * ) Notice: Subject to any disclaimer, the term of this patent is extended or adjusted under 35 U.S.C. 154(b) by 370 days.

(21) Appl. No.: 17/782,576

(22) PCT Filed: Dec. 4, 2020

(86) PCT No.: PCT/EP2020/084614
§ 371 (c)(1),
(2) Date: Jun. 3, 2022

(87) PCT Pub. No.: WO2021/110907
PCT Pub. Date: Jun. 10, 2021

(65) Prior Publication Data
US 2023/0011651 A1    Jan. 12, 2023

(30) Foreign Application Priority Data
Dec. 5, 2019    (DE) .................... 10 2019 218 996.2

(51) Int. Cl.
*G06F 11/30*    (2006.01)
*G01M 13/00*    (2019.01)
*G01M 15/04*    (2006.01)

(52) U.S. Cl.
CPC ............ *G01M 15/04* (2013.01); *G01M 13/00* (2013.01)

(58) Field of Classification Search
CPC .................................................. G01M 15/04
See application file for complete search history.

(56) References Cited

FOREIGN PATENT DOCUMENTS

| CN | 105718633 A | 6/2016 |
|---|---|---|
| DE | 100 60 694 A1 | 6/2002 |

(Continued)

OTHER PUBLICATIONS

International Search Report, dated Mar. 15, 2021 for corresponding International Application No. PCT/EP2020/084614 with English translation (5 pages).

(Continued)

*Primary Examiner* — Phuong Huynh
(74) *Attorney, Agent, or Firm* — Intellectual Property Law Group LLP

(57) ABSTRACT

The invention relates to a method for determining a damage state of components, wherein damage states are determined for a component on the basis of operating states of an overall system that comprises the component by determining time-normalised stress collectives and/or load collectives for each operating state (ZBB), wherein, by means of the time-normalised stress collectives and/or load collectives for each operating state (ZBB) the damage state is determined for the component on the basis of operating states of the overall system that have occurred, and/or the prospective damage state is determined on the basis of predicted prospectively occurring operating states of the overall system that comprises the component, and/or the damage state is determined for a further component, designed similarly to the aforementioned component, depending on operating states that have occurred of a further overall system, which comprises the further component and is designed similarly to the aforementioned overall system, and/or the prospective damage state is determined on the basis of predicted prospectively occurring operating states of the further overall system that comprises the further component.

22 Claims, 1 Drawing Sheet

(56) References Cited

FOREIGN PATENT DOCUMENTS

| DE | 102 15 865 A1 | | 11/2003 |
|---|---|---|---|
| DE | 10236735 A1 | | 2/2004 |
| DE | 102 57 793 A1 | | 7/2004 |
| DE | 102005004023 | * | 8/2006 |
| DE | 102005004023 A1 | | 8/2006 |
| DE | 10 2015 120 203 A1 | | 5/2017 |

OTHER PUBLICATIONS

Written Opinion of the ISA, dated Mar. 15, 2021 for corresponding International Application No. PCT/EP2020/084614 (7 pages).
German Office Action, dated Aug. 26, 2020, for corresponding German application No. 10 2019 218 996.2 with English translation (9 pages).
Wikipedia: Rainflow-counting algorithm (Version vom Feb. 12, 2012) (4 pages).
Written Opinion of the ISA, dated Mar. 15, 2021 for corresponding International Application No. PCT/EP2020/084614 with English translation (14 pages).
China Office Action, dated Mar. 14, 2025 for corresponding China Application No. 202080084156.6 with English translation (17 pages).

\* cited by examiner

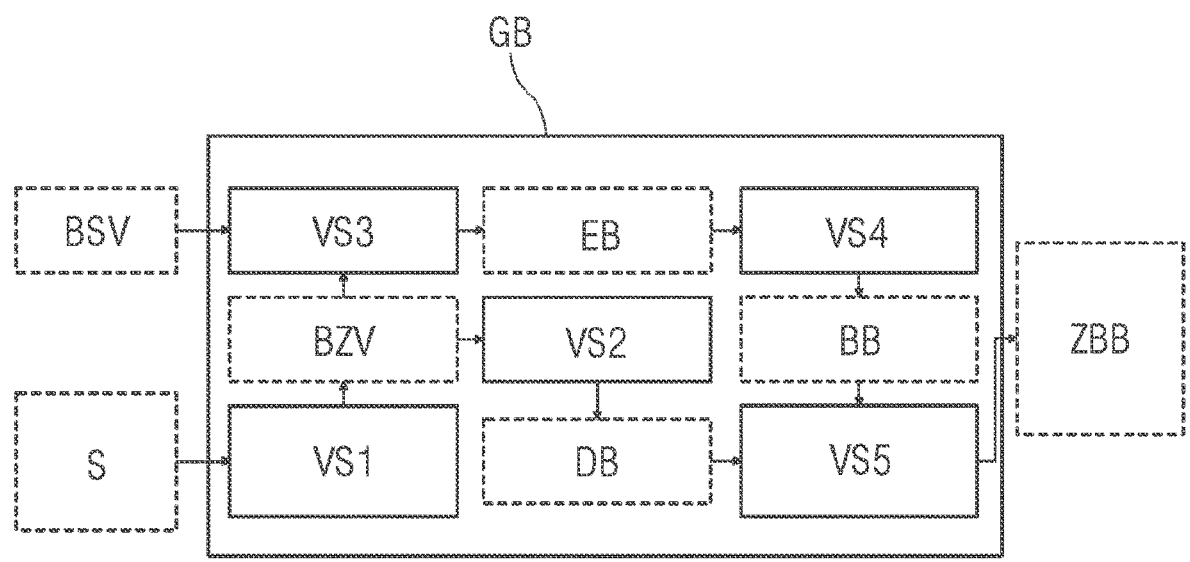

METHOD AND DEVICE FOR DETERMINING A DAMAGE STATE OF COMPONENTS

CROSS-REFERENCE TO RELATED APPLICATIONS

This application is a U.S. National Phase application, under 35 U.S.C. § 371, of International Application no. PCT/EP2020/084614 with an international filing date of Dec. 4, 2020, and claims benefit of German Application no. 10 2019 218 996.2 filed on Dec. 5, 2019, each of which is hereby incorporated by reference for all purposes.

FIELD OF INVENTION

The invention relates to a method and a device for determining a damage state of components.

BACKGROUND

As described in DE 100 60 694 A1, a method for detecting the operating state of internal combustion engines in motor vehicles is known in the art. In this method, measured values and events of the operation of the motor vehicle are recorded and base values are formed from them. Furthermore, classification variables are formed from residence times of two respective measured variables in the form of compound classifications. Both the basic variables and the compound classification variables are stored in a memory and made available as corresponding signals for retrieval. On the basis of the information obtained in this way, a suitable evaluation is carried out with the aim of calculating a target evaluation variable e.g. for the consumption of a service material such as engine oil and fuel and a corresponding comparison is made with a measured consumption value, which allows conclusions to be drawn about the state of wear of the combustion engine or of combustion engine components.

SUMMARY

The object of the invention is to specify a method that is improved compared to the prior art and a device that is improved compared to the prior art for determining a damage state of components.

According to the invention, the object is achieved by a method for determining a damage state of components and by a device for determining a damage state of components according to the appended claims.

Advantageous configurations of the invention are the subject matter of the dependent claims.

In a method according to the invention for determining a damage state of components, damage states are determined for a component as a function of operating states of an overall system comprising the component by recording a time profile of stresses and/or loads on the component and a time profile of signals of the overall system relevant for determining operating states during operation of the overall system, operating states of the overall system that have occurred, in particular a time course of the operating states that have occurred, are determined from the recorded signals, damaging events are determined from the recorded stresses and/or loads and assigned to the operating states, stress collectives and/or load collectives per operating state are determined and, based on a duration of the respective operating state, time-normalized stress collectives and/or load collectives per operating state are determined. This, in particular the recording of the time profile of the stresses and/or loads on the component and the time profile of the signals of the overall system that are relevant for determining operating states, is carried out, for example, during a test or several tests, in particular during a test drive or several test drives and/or during one or several bench tests, and/or during one or more simulations. The detection of the time profile of the stresses and/or loads on the component, in particular the detection of the stresses and/or loads on the component, is carried out in particular by means of a corresponding unit for detecting the stresses and/or loads on the component, in particular by means of a sensor system, for example comprising at least one sensor or several sensors, in particular on the component, i.e. this sensor system advantageously forms this unit for detecting the stresses and/or loads on the component. This sensor system is designed and set up to record the stresses and/or loads on the component and is expediently arranged on the component. The test drive or the respective test drive does not have to be be specifically predetermined and carried out in accordance with such a specification in order to achieve specifically predetermined operating states, but operating states that have occurred, in particular a time profile of the operating states that have occurred, are determined from the time profile of the recorded signals of the overall system that are relevant for determining operating states. Thus, tests of this type, in particular test drives, can for example also be carried out during normal operation of the overall system, although sensors are required to record the stresses and/or loads on the component, in particular their time profile.

The assignment of the damaging events to the operating states takes place in particular in such a way that the e.g. mechanical, in particular material-mechanical, damaging events resulting from the stresses and/or loads, e.g. load changes, are proportionally assigned to all operating states involved in their formation in a rainflow classification. This enables an automated assignment of characteristic damage values to operating states. Load changes are a possible form of damaging events.

By means of these time-normalized stress collectives and/or load collectives per operating state, the state of damage is now determined, for example, for the component as a function of operating states that have occurred in the overall system and/or the future state of damage is determined, for example, as a function of predicted future operating states of the overall system comprising the component and/or or, for example, the state of damage is determined for a further component designed in the same way as this component as a function of operating states that have occurred in a further overall system that includes this further component and is designed in the same way as the overall system and/or the future state of damage is determined, for example, as a function of predicted future operating states of the further overall system comprising the further component. This, i.e. in particular the determination based on operating states that actually occurred can advantageously take place during normal operation of the overall system, i. e. test drives and simulations are then no longer required for this and in particular no sensors for determining the stress and/or load on the component are then required. The other variant of the determination based on future predicted operating states is not tied to actual operation of the overall system, but assumes a predicted corresponding future operation of the overall system. In the variant of determining using operating states that have actually occurred, these operating states are also recorded based on the time profile of the signals of the overall system that are relevant for determining operating states, i. e. the time profile of the signals of the overall system relevant for determining operating states is also recorded here during operation, in particular during normal operation, of the overall system, and operating states of the overall system that have occurred, in particular the time profile of the operating states that have occurred, are determined from the recorded signals.

As is already clear from the formulation of the recording of the time profile of the signals of the overall system relevant for determining operating states and the determination of the operating states of the overall system that have occurred, in particular the time profile of the operating states that have occurred, operating states are advantageously determined continuously over an entire recorded time profile, i. e. each point in time of the operation of the overall system, in which relevant signals of the overall system for determining operating states were determined, is assigned to a respective operating state. The operation of the overall system is thus advantageously a continuous sequence of operating states. Exactly one operating state is active at any point in time, namely that state which results from the current signals of the overall system that are relevant for determining operating states.

In summary, in a first part of the method, time-normalized stress collectives and/or load collectives for operating states are determined on the basis of the time profile of stresses and/or loads and the time profiles of signals relevant for determining operating states, and in a second part of the method, based on the time-normalized stress collectives and/or time-normalized load collectives per operating state determined in the first part of the method and the operating states that now occur, the damage state of the component is determined. This second part of the method can be carried out during normal operation of the overall system, in particular without having to equip the overall system with additional sensors for detecting the time profile of stresses and/or loads.

The overall system is, for example, a vehicle, a machine or another designed overall system.

The determination of the stresses and/or loads is only absolutely necessary during the period of determination of the time-normalized stress collectives and/or load collectives, i.e. only during the course of the first part of the method mentioned above, i. e. it is not necessary to record the stresses and/or loads in normal operation. For this reason, the detection, in particular measurement, of the stresses and/or loads during the determination of time-normalized stress collectives and/or load collectives can preferably be carried out by means of the additional sensors already mentioned above, which are not included as standard in the overall system, i. e. using sensors that do not have to be available during normal operation of the overall system. This, in particular additional, sensor system includes, for example, one or more strain gauges, force sensors and/or temperature sensors.

The signals of the overall system that are relevant for determining the operating states are recorded and used during the determination of the time-normalized stress collectives and/or load collectives, i. e. in the first part of the method mentioned above, and advantageously also during normal operation of the overall system, i.e. in the above-mentioned second part of the method, in the second part of the method in particular to determine the operating states of the overall system that have occurred, in order to determine the state of damage as a function of this, at least if these operating states are not predicted as operating states that will occur in the future, as described above as an alternative.

Such signals of the overall system that are relevant for determining operating states can be, for example, a driving speed or a position of switches, particularly if the overall system is a vehicle.

Alternatively or additionally, the determination of the time-normalized stress collectives and/or load collectives can be carried out completely or partially on the basis of a simulated operation of the overall system, in which the stresses and/or loads and in particular the signals of the overall system relevant to the determination of operating states, which also are available during normal operation of the overall system, are simulated.

Using the method according to the invention, the damaging events are determined as a function of the operating states of the overall system that have occurred. This makes it possible to determine a damage state of the component or a similar further component exclusively on the basis of the operating states of the respective component and their respective duration, or to predict a damage state of the component or a similar further component exclusively based on predicted future operating states of the respective component and their respective duration, because the solution according to the invention enables the reconstruction of a stress collective and/or load collective for the respective specific component solely from the detection of the operating states of the overall system, which includes this component. The method according to the invention can thus be used, for example, for online monitoring of the current damage state of the component without having to determine the stress profile and/or load profile on the component itself. As already described above, a prerequisite for this reconstruction is the prior determination of time-normalized stress and/or load collectives for each operating state that occurs on the same and/or on another similarly designed component of a similarly designed further overall system, which have been determined and used for the reconstruction using the procedure according to the invention, in particular according to the first part of the method described above.

The method according to the invention provides in particular an operating state-dependent stress analysis and/or load analysis for the reconstruction of future and/or historical stress collectives and/or load collectives of a component. Operating state-dependent stress collectives and/or load collectives are determined, and from this future and/or historical stress collectives and/or load collectives can be determined to describe the current damage state of a component without having to carry out a stress measurement and/or load measurement on this component.

The method can be applied to components to which a stress collective and/or load collective can be assigned, on the basis of a stress-time history and/or load-time history, i. e. on the basis of a recorded time history of stresses and/or loads. Herein, the stress collective and/or load collective must be determined by determining damage-relevant events from the stress-time profile or from the load-time profile. In particular, the definition of a damage-relevant event is based on the basic damage mechanism for a specifically considered component and on the method used to describe the current damage state as a result of the occurrence of damage-relevant events. For example, damage-related events for the damage mechanism "Mechanical material fatigue as a result of cyclic stressing and/or loading" are defined in the description according to the nominal stress concept of operational stability as so-called load changes, whereby the person skilled in the art is familiar with other methods for describing this and/or other damage mechanisms, with their own definitions for events relevant to damage.

The stress and/or load can be, for example, a mechanical stress, a variable proportional to the mechanical stress, a temperature, a pressure, an electrical voltage, an electrical current or another physical variable. In particular, stresses and/or loads mean physical measured variables that, depending on the damage mechanism relevant to the component, represent measured variables that are directly relevant to damage and/or designate one or more measured variables that can be converted into a measured variable that is directly relevant to damage using at least one calculation and/or simulation model.

The principle of the method according to the invention is based on the assignment of the operating states to the associated stress measurement value and/or load measurement value and the generation of a respective individual set of damage characteristics, i. e. a set of damaging events.

Herein, a respective damaging event is advantageously distributed proportionately to the operating states involved.

In one possible embodiment of the method, a damaging event, in particular a respective damaging event, is divided equally among the operating states involved.

In a further, in particular alternative, possible embodiment of the method, the respective damaging event is divided among the operating states involved, in a weighted manner in relation to the operating states involved in its emergence. In one possible embodiment of the method, the weight of the respective operating state is determined by determining the period during which the damaging event occurred and the total duration of the respective operating state within this period, and the weight being the ratio of the total operating state duration of the respective operating state to the total duration of the damaging event. For example, the period for the total duration of a damaging event can be considered according to the nominal stress concept of operational stability as the period between the first and last reversal point of a load change or alternatively as the period between the first and last reversal point of a load change, excluding the periods of time attributable to the occurrence of included load changes. The sum of the weights of all operating states must again correspond to the original frequency of the damaging event.

The breakdown of the respective damaging event according to the above-described embodiments of the method can also be illustrated using the following formulas:

For the weighted distribution applies:

$$H_i = G_i \cdot H_0, \tag{1}$$

where Hi is the resulting frequency of the damaging event in the operating state i, Gi is the weight for the operating state i, and H0 is the original frequency of the damaging event before the split.

The condition is that:

$$\sum_{i=1}^{nB} G_i = 1 \tag{2}$$

where nB is the number of operating states.

For a distribution weighted according to characteristic points (in the case of load changes their reversal points) the following applies:

$$G_i = \frac{N_i}{N_0} \tag{3}$$

Here, Ni is the number of characteristic measurement points in operating state i and N0 is the number of characteristic measurement points for the entire damaging event.

For a time-weighted split applies:

$$G_i = \frac{t_i}{t_0}, \tag{4}$$

where ti is the dwell time of operating state i during the damaging event and t0 is the total duration of the damaging event.

For a weighted split after incremental change in stress and/or load applies:

$$G_i = \frac{\Delta B_i}{\Delta B_0}, \tag{5}$$

where $\Delta B_i$ is the accumulated increment of stress and/or load in operational state i and $\Delta B_0$ is the total increment of stress during the damaging event.

In order to obtain the time profile of the operating states that have occurred, the signals of the overall system are advantageously classified into classes and possible operating states are thereby defined. I.e. the operating states are determined from the recorded signals of the overall system, in particular using signals that are also available during normal operation of the overall system. For example, when classifying, the value range of all signals to be considered in the overall system is individually and completely divided into classes, i. e. intervals, for each signal, with each possible combination of the classes of all considered signals of the overall system then being defined as an operating state, i. e. the definition of possible operating states is carried out. This can therefore also take place, for example, during normal operation and/or after normal operation of the overall system. A specification of operating states that the entire system must go through, i. e. in the form of a standardized test drive, is therefore not necessary. The method described here is therefore significantly more flexible and can, for example, also be used in normal customer operation of complete systems, for example vehicles.

The duration of the respective operating state is advantageously determined by forming a multi-dimensional histogram for the signals of the overall system with the classes into which they are divided, on the basis of which the duration of the respective operating state is determined. The histogram is advantageously determined using a multi-parameter, related instantaneous value count. This means that for each measuring point at which a stress measurement value and/or load measurement value was recorded, the values of all recorded signals of the overall system relevant to the determination of the operating states (i.e. the recorded signals with the exception of the strain and/or load) are determined and the associated classes of the signals are determined. For each combination of classes there is exactly one element in the histogram whose count value is increased by the time interval from the previous measurement point. Herein, each element of the histogram formally represents an operating state. The result is thus a duration of the operating states of the overall system.

As an alternative to the procedure described in the two previous paragraphs, i. e. alternative to the described classification for the definition of possible operating states, in order to obtain the time course of the operating states that have occurred, and for the described determination of the duration of the respective operating state, the operating states can also be determined, for example, using methods of artificial intelligence from the signals relevant for determining operating states.

To determine the duration of the operating states in normal operation of the overall system, i. e. in particular for operation in which no stresses and/or loads need to be determined, and thus in particular for the second part of the method mentioned above, a one-parametric dwell time count is preferably used, in which the dwell time of the overall system in the individual operating states is determined from the operating state over time, which is determined, for example, according to one of the previously described methods, whereby a duration of the operating states of the overall system is obtained in normal operation.

The determination of the damaging events per operating state advantageously occurs by using a counting method suitable for the present stress variable and/or load variable to transfer the variable from the time range to the frequency range, damaging events in the frequency range are determined from the recorded stresses and/or loads in the time range and assigned to the operating states. For this purpose, a stress analysis and/or load analysis is advantageously carried out, in which the damaging events are determined using a suitable counting method and a quantitative characteristic pertaining to the damaging contribution is assigned to the determined damaging events. Herein, either all damaging events can be determined first, while the damage contribution is assigned to all events in a next step, or the damage contribution for this event can be assigned directly after the determination of a damaging event, before further events are determined.

In the stress analysis and/or load analysis, in particular according to the nominal stress concept or the notch stress concept of operational stability, each stress and/or load is advantageously assigned its associated operating state on the basis of the signals from the overall system, a rainflow classification of the stresses and/or loads to determine the occurrence of damaging events in the form of load changes is carried out, a separate rainflow matrix is generated for each operating state, in which the counted load changes are distributed proportionally to the operating states involved in the generation of the load changes. This is done, for example, by dividing the respective load change into two half load changes and storing them in the rainflow matrices of the operating states associated with its reversal points. In order to take a residual into account, the respective load change is divided according to a type of consideration, in particular whether there is no load change, half a load change or a complete load change, to the rainflow matrices of the operating states involved, in particular proportionally, in a possible embodiment of the method at 50% each, distributed to the rainflow matrices of the operating states involved. The associated reversal points are in particular the first two reversal points of the load change, which are removed from the stress-time history and/or the load-time history in a classic rainflow classification after a load change has been counted.

In a possible further embodiment of the method, the distribution of the respective load changes and/or the residuals to the operating states involved can take place according to one of the methods described above for the temporal weighting of damaging events. Advantageously, a separate rainflow matrix is generated in the stress analysis and/or load analysis for each operating state, in which the counted load changes are distributed proportionally to the operating states involved in the occurrence of the load changes, by dividing the respective load change in a weighted manner to the operating states involved in its occurrence and storing it accordingly in the rainflow matrices of these operating states. For considering a residual, the respective load change is divided according to a type of consideration, in particular whether there is no load change, a half load change or a complete load change, weighted according to the operating states involved in its creation and divided among the rainflow matrices of the operating states involved.

The weight of the respective operating state is determined, for example, by determining a period during which the respective load change occurred and a total duration of the respective operating state within this period, and the weight is the ratio of the total operating state duration of the respective operating state to the total duration of the respective load change. For example, according to the nominal voltage concept, the time period for the total duration of the respective load change can be considered as the time period between the first and last reversal point of the load change or alternatively as the time period between the first and last reversal point of the load change excluding the time periods attributable to the occurrence of included load changes. The sum of the weights of all operating states must again correspond to the original frequency of the load change.

In a possible further embodiment, the weight of the respective operating state is determined as the ratio of the accumulated amounts of the stress and/or load increments of the associated load changes in the respective operating state to the entire stress and/or load increment of the associated load changes, wherein the total stress and/or load increment of the associated load changes is twice the difference between the upper and lower stress or load measurement values of the reversal points of the associated load changes. In this embodiment of the method, the distribution of the respective load changes and/or residuals to the operating states involved can therefore be based on the accumulated amounts of the stress and/or load increments, with the total stress and/or load increment of a load change being twice the difference from the upper to the lower stress or load measured values of the reversal points, and the weight of an operating state is the ratio of the accumulated amounts of the stress and/or load increments that have occurred in the respective operating state to the total stress and/or load increment of the load change. This procedure corresponds to an energetically motivated weighting of the operating states based on the proportionally performed mechanical work within an operating state.

Advantageously, in this embodiment of the method, a separate rainflow matrix is generated for each operating state in the stress analysis and/or load analysis, in which rainflow matrix the counted load changes are divided based on the accumulated amounts of stress and/or load increments among the operating states involved in the occurrence of the load changes, where the total stress and/or load increment of a respective load change is twice the difference from the upper to the lower stress or load measured values of reversal points of the load change, and the weight of the respective operating state is the ratio of the accumulated amounts of the stress and/or load increments that have occurred in the respective operating state to the total stress and/or load increment of the load change. In order to take a residual into account, the respective load change is divided according to a type of consideration, in particular whether there is no load change, half a load change or a complete load change, based on accumulated amounts of the stress and/or load increments on the rainflow matrices of the operating states involved, wherein the total stress and/or load increment of a respective load change is twice the difference from the upper to the lower stress or load measured values of the reversal points of the load change, and the weight of the operating state is the ratio of the accumulated amounts of the stress and/or load increments that have occurred in the respective operating state to the total stress and/or load increment of the load change. The sum of all weights is therefore always equal to 1 and, as mentioned, the weights are multiplied by the original frequency, i. e. 0, ½ or 1 in the case of the residual depending on how the residual is considered, in particular whether no load change, half a load change or a load change, and always 1 in the case of a regular load change. This applies in particular regardless of what the damaging events are.

This can also be expressed with formula (5), where the following applies to the total stress and/or load increment $\Delta B_0$:

$$\Delta B_0 = 2(B_{Ob} - B_{Ub}) \tag{6}$$

The weight Gi of the operating state i results from formulas (5) and (6):

$$G_i = \frac{\Delta B_i}{2(B_{Ob} - B_{Ub})}, \tag{7}$$

where Gi is the weight of operating state i, $\Delta B_i$ are the accumulated amounts of stress increments and/or load increments, BOb is the upper stress measured value and/or load measured value, and BUb is the lower stress measured value and/or load measured value.

In this variant, H0=1 would be for regular load changes and H0∈{0,0.5,1} for residuals according to no/half/complete load change.

The stress collectives per operating state are advantageously determined by evaluating the rainflow matrices individually for each operating state, in particular by extracting the recorded load changes.

In an alternative procedure, each stress and/or load in the form of mechanical stress or mechanical strain is advantageously assigned with its associated operating state based on the signals of the overall system and a rainflow classification of the stresses and/or loads is carried out to determine the occurrence of damaging events in the form of load changes. Herein, the determined load changes are converted directly after their determination and/or taking into account the order in which they occur into a damage parameter, in particular according to the notch strain concept of operational strength, and added to the operating states involved in the associated load change (here in particular operating states associated with the reversal points of the load change) respectively as damage parameters, in particular proportionally, in a possible embodiment of the method with half the original frequency—i. e. ½—to the damage parameter collectives of the associated operating states. Herein, the damage parameter collectives for each operating state represent the stress collectives and/or load collectives per operating state.

In a further possible embodiment of the method, the distribution of the damage parameters to the operating states can be weighted, preferably using one of the methods described above for determining the weights of damaging events or load changes, in particular as described in formulas (1) to (7).

For example, in the stress analysis and/or load analysis, the load changes determined are converted into a damage parameter directly after their determination and/or taking into account the order in which they occur, and respectively added as damage parameters, weighted according to the operating states involved in its formation, to damage parameter collectives of the operating states involved in the associated load changes, the damage parameter collectives per operating state representing the stress collectives and/or load collectives per operating state.

Herein, the weight of the respective operating state is determined by determining a period during which the respective load change has occurred, and a total duration of the respective operating state within this period, and the weight results as the ratio of the total operating state duration of the respective operating state to the total duration of the respective load change. In a possible further embodiment of the method, the weight of the respective operating state is determined as the ratio of the accumulated amounts of the stress and/or load increments of the associated load changes in the respective operating state to the total stress and/or load increment of the associated load changes, with the total stress—and/or load increment of the associated load changes being twice the difference from the upper to the lower stress or load measurement values of the reversal points of the associated load changes. In this embodiment, the damage parameters can therefore be divided among the operating states involved based on the accumulated amounts of the stress and/or load increments of the underlying load changes, with the total stress and/or load increment of a load change being twice the difference between upper and lower stress or load measured values of the reversal points, and the weight of an operating state being the ratio of the accumulated amounts of the stress and/or load increments of the load change that have occurred in the respective operating state to the total stress and/or load increment of the load change. This procedure corresponds to an energetically motivated weighting of the operating states based on the proportionally performed mechanical work within an operating state on a damage parameter.

This is already indicated, for example, in the above formulas (1) to (7) for damaging events, with load changes being a special form of damaging events.

The method according to the invention can thus be used to perform a stress analysis and/or a load analysis dependent on the operating state, starting from stress analysis and/or load analysis according to the respective state of the art suitable for the description of the damage mechanism, in particular, but without restricting the generality, a stress analysis and/or load analysis according to the nominal stress concept, the notch stress concept and/or the notch strain concept of operational strength, wherein the person skilled in the art is aware of other methods of stress analysis and/or load analysis depending on the relevant damage mechanism, in which damaging events are determined to describe a state of damage based on stress-time histories and/or load-time histories, to which the method according to the invention can also be applied.

The time-normalized stress collectives and/or load collectives per operating state are advantageously determined by normalizing the stress collectives and/or load collectives per operating state in the frequency of their individual collective stages to the duration of the associated operating state and/or by normalizing the stress collectives and/or load collectives per operating state using the duration of the associated operating state. A collective stage is defined here as a damage characteristic with a damage parameter that quantitatively describes the damage content and the frequency of the occurrence of damaging events with this damage parameter. For example, a collective stage in the sense of the nominal stress concept or the notch stress concept of operational stability is described by the damage characteristic of load change with the quantitative damage parameter "amplitude" and the frequency of load changes with this damage parameter. Alternatively, a collective level according to the nominal stress concept can also be given as an entry in a rainflow matrix, with the quantitative damage characteristic value then being available through the row and column number and the frequency as the corresponding count of the matrix element. In the latter case, a normalization of the stress collective and/or load collective can be carried out in accordance with a method known to those skilled in the art for extrapolating rainflow matrices.

In an alternative embodiment, the frequency of the individual collective stages can also be normalized to a different variable, for example a distance covered in the case of mobile overall systems and/or a worked area in overall systems for tillage, for example in the field of agricultural machinery technology, whereby these stress collectives and/or load collectives be referred to as path-normalized and/or area-normalized. The determination of the duration of the operating states is accordingly replaced and/or supplemented by the determination of the distance covered and/or the worked area per operating state.

The method can be carried out, for example, by means of a device which, for example, is arranged directly to the overall system, i.e. onboard, or which, for example, is arranged partly on the overall system and partly offboard, i.e. external with regard to the overall system. In the external with regard to the overall system case, the device includes in particular a processing unit, for example in the form of a computer. In the case of the device arranged completely on the overall system, the processing unit is, for example, a control unit or another computer unit. In the external with regard to the overall system case, the method can be carried out, for example, on the basis of externally recorded data, in particular time profiles of the stress and/or load on the component under consideration and the signals of the overall system that are relevant for determining the operating states. For example, the device includes corresponding acquisition units on the overall system for this purpose, which transmit this data to an external unit, in particular to the processing unit for recording and processing. Alternatively, this data can, for example, first be recorded in the overall system and later transmitted to the processing unit for evaluation. The data can be transmitted wirelessly, for example via radio, or by cable.

Such a device according to the invention is thus designed and set up to carry out the method.

The device comprises, for example, at least one unit for detecting the stresses and/or loads on the component, in particular the above-mentioned sensors, at least one unit for detecting the signals of the overall system that are relevant for determining operating states, and at least one processing unit. The processing unit is designed and set up in particular to carry out the above-mentioned method steps, in particular to process the detected stresses and/or loads on the component and the signals of the overall system that are relevant for determining operating states, in particular in the manner described above.

For example, as already mentioned, the device can be arranged or arrangeable completely on the overall system or, for example, at least one component of the device, in particular the at least one unit for recording the stresses and/or loads on the component and/or the at least one unit for recording the signals of the overall system that are relevant for determining operating states, is arranged or can be arranged on the overall system. The processing unit is then, for example, a component of the device that is external to the overall system, for example a computer.

Exemplary embodiments of the invention are explained in more detail below with reference to a drawing.

To avoid misunderstandings, it should be pointed out here that the terms stress collective, stress analysis, stress-time history, stress history, stress measurement and stress measured value used above each refer to the implementation of the method using stresses. The method can also be carried out analogously, alternatively or additionally, by means of loads, to which the terms load collective, load analysis, load-time history, load history, load measurement and load measurement value which have been used alternatively or additionally above, apply accordingly.

BRIEF DESCRIPTION OF THE DRAWING

FIG. 1 shows a schematic sequence of a method for determining a damage state of at least one component.

DETAILED DESCRIPTION OF SPECIFIC EMBODIMENTS

FIG. 1 schematically shows a sequence of a method for determining a damage state of components, in particular mechanical components. This method enables an operating state-dependent stress analysis for the reconstruction of future and/or historical stress collectives of a component. In particular, the method makes it possible to determine operating state-dependent stress collectives for the reconstruction of future and/or historical stress collectives to describe the current damage state of a component without having to carry out a stress measurement on the component for this purpose. The prerequisite for this is the determination of time-normalized, operating-state-dependent stress collectives for the same component or a component of the same design in advance by means of corresponding stress measurements on the component.

As an alternative or in addition, the sequence of the method described below for determining a damage state of components, in particular mechanical components, does not take place by means of stresses, but loads. The method then enables an operating state-dependent load analysis for the reconstruction of future and/or historical load collectives of a component. The method then enables, in particular, a determination of load collectives dependent on the operating state for the reconstruction of future and/or historical load collectives for describing the current damage state of a component without having to carry out a load measurement on the component for this purpose. Therefore, in the following description relating to the stresses, the respective term or part of the term stress may be substituted for the term or part of the term load to describe the analogous process for loads and load analysis.

The method can be applied to components to which, based on a stress-time history BSV, i. e. a time history of stresses on the component that have occurred, a stress collective can be assigned. Herein, the stress collective must be determined by determining damage-relevant events from the stress-time history BSV. The stress and/or load can be, for example, a mechanical stress, a variable proportional to the mechanical stress, a temperature, a pressure, an electrical voltage, an electrical current or any other physical variable.

It is already known from the prior art to carry out a mechanical stress analysis in terms of operational stability. For this purpose, material-mechanical damage-relevant events are recorded on the basis of a stress-time function and processed into a stress collective, for example a stress amplitude collective (nominal stress concept, notch stress concept) or a damage parameter collective (notch strain concept).

Herein, the mechanical stress is first subjected to a rainflow classification. From a rainflow matrix obtained in this way, recorded load changes are determined according to amplitude, mean value and frequency. In the case of rainflow classification, a residual remains (reversal points that do not produce any load changes), which, depending on the application, is not taken into account, is taken into account as half a load change, or is taken into account as a full load change. An amplitude-mean-value collective created in this way can be transformed into an equivalent amplitude collective by means of a Haigh diagram and thus results in the desired stress collective.

However, since a measurement period is usually significantly shorter than the service life of the component, the stress collective obtained must be extrapolated in order to obtain a design collective for the entire service life of the component. According to the current state of the art, this extrapolation is primarily based on the relationship between the measurement duration and the planned duration of use. Herein, it is assumed that the stress behaves during the service life as was the case in the measurement. This requires precise knowledge of a future application profile as early as the planning of experiments in order to correctly map the composition of the various application scenarios and to obtain a design collective that is as representative as possible.

Theoretical and experimental service life analyzes can be carried out with the design collective obtained in this way.

In order to determine the current damage status of a component, a current stress collective is required, which reflects the stress history of the component. At present, for this purpose, either a measurement of the stress over the entire period of use or a reconstruction based on the previously determined design collective must be carried out.

Such a reconstruction of a current stress collective has so far been based mainly on the relationship between the current and planned service life. It follows that the collective forms of the reconstructed current stress collective and the design collective do not differ, and in the case of a relative service life analysis using a damage accumulation hypothesis, effectively only the associated service lives are compared. Due to this fact, the use of such reconstructed stress collectives for damage assessment in the sense of predictive maintenance, i. e. in terms of predictive maintenance, is questionable.

Furthermore, there are approaches according to the state of the art that determine separate stress collectives for selected, previously defined operating states from defined test operations and superimpose them in a weighted manner to a design collective according to a usage profile. This way, it is also possible to reconstruct a current stress collective based on a usage profile. However, this procedure is associated with a high level of effort in test planning and implementation. The number of manageable operating states is severely limited.

With the method described below, the stress analysis of a component is therefore extended in such a way that the damage-relevant events are determined as a function of the operating states of an overall system that have occurred. The method thus enables a stress collective for a specific component to be reconstructed solely from the detection of the operating states of the overall system if time-normalized stress collectives are known for the operating states that occur, which have advantageously been determined beforehand using the method described here. This can be used, for example, for online monitoring of the current damage status of the component without having to determine the stress history on the component itself.

Advantageously, in this method, damage states are determined for a component as a function of operating states of an overall system comprising the component, by recording a time history of stresses on the component and a time profile of signals S of the overall system relevant for determining operating states during operation of the overall system, by recording operating states of the overall system that have occurred, in particular a time profile of the operating states that have occurred, from the recorded signals S, by determining damaging events from the recorded stresses and assigning them to the operating states, by determining stress collectives per operating state BB, and by determining time-normalized stress collectives per operating state ZBB based on the duration of the respective operating state. By means of these time-normalized stress collectives per operating state ZBB, it is now possible, for example, to determine the damage state for the component as a function of occurring operating states of the overall system. As an alternative or in addition, the future state of damage can be determined, for example as a function of predicted future operating states of the overall system comprising the component. Alternatively or additionally, the state of damage can be determined, for example, for a further component designed in the same way as this component, depending on operating states that have occurred in a further overall system that includes this further component and is designed in the same way as the overall system. Alternatively or additionally, the future damage state can be determined, for example, as a function of predicted future operating states of the further overall system comprising the further component.

The procedure is described below using stress on a component in the form of mechanical stress, which is available as a discrete time history. Thus, a stress-time history BSV of the component, i.e. a, in particular discrete, time history of the stresses, i.e. of stress measurements of the component, is recorded as data. In addition to this stress-time history BSV, which is in the form of a voltage curve in the example described here, signals S from the higher-level overall system that includes the component are recorded as additional data. To be more precise, a time history of these signals S is recorded. In particular, these are signals S that are relevant for determining operating states of the overall system. In particular, these signals S are also available during normal operation of the overall system In a first method step VS1, these signals S are first divided into ranges, in particular classes, that are characteristic of the operating states that occur, in order to define possible operating states of the overall system. The result is an operating state-time history BZV, i.e. a time course of the operating states that have occurred.

For the signals S used with the classes defined in this way, a multi-dimensional histogram is then formed in a second method step VS2, based on which the duration of the respective operating state is determined, the histogram in particular having one dimension for each of the signals S.

For example, for the analysis of a component designed as a mechanical vehicle component, such a signal S can be the driving speed, for example. The relevant areas would be given by planned operating points. For example, four classes can be defined here, in which the driving speed is typically found:

standstill (speed=0 km/h),
city driving (speed between 0 km/h and 50 km/h),
overland driving (speed from 50 km/h to 100 km/h),
motorway driving (speed greater than 100 km/h).

The histogram is determined in the second method step VS2 via a multi-parameter, related instantaneous value count. This means that for each measuring point at which a stress measurement value was recorded, the values of all recorded signals S of the overall system relevant for determining the operating states (i.e. the recorded signals S with the exception of the mechanical stress) are determined and the associated classes of the signals S are determined. For each combination of classes there is exactly one element in the histogram whose count value is increased by the time interval from the previous measurement point. Herein, each element of the histogram formally represents an operating state. The result of this second method step VS2 is therefore a duration of the operating states DB of the overall system.

A real sequence of operating states and a real duration of the respective operating state are thus determined instead of processing a predetermined sequence and duration of operating states by means of the overall system. The method can thus be carried out, for example, in a real operation of the overall system, whereby more realistic results can be achieved in comparison to a test system and specified operating states carried out with it during a test operation. In particular, the advantage over previous methods results from the fact that changes in the operating states can be recognized automatically and do not have to be taken into account particularly or be caused deliberately.

The next and thus third method step VS3 is a stress analysis, which is modified compared to the previously used stress analysis described above. This means that there is a determination of the damage-relevant events, i.e. events damaging the component, which determination is modified compared to the approach described above and known in the art. For this purpose, each stress measurement value is first assigned its associated operating state on the basis of the signals S of the overall system. Input data are thus the determined operating state-time history BZV and the stress-time history BSV. A modified form of rainflow classification is then carried out. Herein, the determination of the damaging events, in this example the load change, is carried out according to the classic rainflow classification. The actual modification takes place when these determined events damaging the component are stored.

According to the classic method, the load changes would be stored in a rainflow matrix. In contrast to this, in the method described here, a separate rainflow matrix is generated for each operating state, in which rainflow matrix the counted load changes are distributed proportionally to the operating states involved in the occurrence of the load changes.

A load change according to the classic rainflow classification consists of two reversal points, which are removed from the stress history after counting the load change, each of which is characterized by a stress measurement value and/or load measurement value. In the method described here, in addition to the stress measurement value of the reversal points, the associated operating conditions are also known though. Therefore, the respective load change is divided into two half load changes and stored in the rainflow matrices of the operating states pertaining to the reversal points.

The residual is taken into account in a similar way. Here too, the load change is distributed 50% each between the rainflow matrices of the operating states involved according to the type of consideration, i.e. whether there is no load change, a half load change or a complete load change. The result of the modified rainflow classification corresponds to the result of the classic rainflow classification described above only in the special case that only one operating state has occurred.

In an alternative embodiment, the division takes place on the basis of the energetically motivated weighting described above. In contrast to the classic rainflow classification, not only the reversal points are considered, but all measured stress values and their associated operating states within the period over which the load change lasts. For each time interval, the amount of the load increment, i.e. the voltage difference between the two points in time, is assigned to the operating state effective at the beginning of the time interval. The energetically motivated weight of an operating state over the entire load change is then the sum of the amounts of the load increments assigned to it, divided by twice the difference between the highest and lowest stress value of the load change. The load change is then added as the product of its frequency and the energetically motivated weight of the operating state to the entry in the rainflow matrix of the corresponding operating state. The position of the load change in the rainflow matrices, i.e. the line number and the column number of the operating states, is unchanged compared to the prior art. All measuring points of the load change, except for the last one, are then removed from the voltage-time history and from the operating state-time history, which means that included load changes are removed from the further count, as in the classic rainflow classification. In this procedure too, the result for the special case that only one operating state occurred corresponds to the result of classic rainflow classification.

The result of this third method step VS3 are the events that damage the component per operating state EB, i.e. the allocation of the events damaging the component to the operating states.

In the example shown, the rainflow matrices obtained in this way are advantageously evaluated individually in at least one further, here fourth, method step VS4 for each operating state in order to obtain stress collectives per operating state BB as a result. The recorded load changes, in the exemplary embodiment described here, of the mechanical stress according to stress amplitude, mean stress and frequency are extracted herein. The mean stress is taken into account according to the Haigh diagram, preferably for a damage-equivalent, mean-stress-free amplitude. In this way, the stress collectives per operating state BB are obtained as equivalent amplitude collectives per operating state. In a further, here fifth, method step VS5, these are normalized in the frequency of their individual collective stages to the duration of the associated operating state. This means that the extent of the stress collectives is normalized with the duration of the respectively associated operating state. The quantitative description of the damage content of damage features is thus given in this example as a mean stress-transformed stress amplitude, which is also known to the person skilled in the art as the equivalent stress amplitude.

In one possible embodiment of the method, the level of stress on the individual collective stages can also be influenced in this normalization process in addition to this. This is done taking into account statistical characteristics of the distribution of the maximum stress values and the ratio of the duration of an operating state to a predicted total service life of the overall system.

The result is a time-related, i.e. time-normalised, stress collective per operating state ZBB, i.e. a time-normalized stress collective for each operating state. This is the related, i.e. time-related, damage characteristic of the respective operating state.

The procedure described for determining the time-normalized stress collective per operating state ZBB from the stress-time history BSV for the component and the time history of the signals S of the overall system comprising the component is a coupled stress analysis GB.

The procedure described is an example of the evaluation of a mechanical stress-time history based on the nominal stress concept or the notch stress concept of operational strength, but is not limited to these applications. The principle of the method described here is based on the assignment of the operating states of the overall system to the associated stress measurement value of the component and the generation of a respective individual set of damage characteristics for the respective operating state, with a damaging event being divided equally among the operating states involved.

By means of the time-related, i.e. time-normalized stress collectives per operating state ZBB determined in the above-described way, a stress collective for a component can now be reconstructed for any period of time, for example for the component by means of which the time-normalized stress collectives per operating state ZBB were determined in the manner described above and shown in FIG. 1, and/or likewise for a similar further component of a similar further overall system. For this, only a histogram for the occurrence of the operating states of this component, for which the stress collective is to be reconstructed, more precisely, the overall system with this component, is required in a respectively considered time interval, i.e. a time interval of interest.

The occurrence of the operating states can be determined, for example, by actually occurring operating states of this overall system being recorded, for example analogously to the procedure described above according to method steps VS1 and VS2 from a recorded time history of signals S of this overall system, or an operating state history can be specified, for example resulting from a usage prediction for the overall system. The time-related, i.e. time-normalised, stress collectives per operating state ZBB are now extrapolated to the duration of the respective operating state, for example by multiplying their frequency by the duration of the respective operating state, and then superimposed to form a total stress collective over all operating states.

In one possible embodiment of the method, the level of stress and/or load on the individual collective stages can also be influenced in this extrapolation process in addition to this. This is done taking into account the statistical parameters of the distribution of the maximum stress values used for normalization and, for example, the ratio of the duration of an operating state to a predicted total service life of the overall system.

In a further possible embodiment of the method, the normalization and extrapolation is carried out on the basis of the extrapolation of rainflow matrices, with method step VS4 not initially occurring. In this case, in the method step VS5, the rainflow matrices are normalized directly as an extrapolation to lower operating state durations. Before determining a total stress collective, the rainflow matrices of the operating states are first extrapolated based on the duration of the respective operating state, followed by method step VS4 to determine a current stress collective of the operating state based on a current rainflow matrix, and finally the superposition of all current stress collectives of the operating states that have occurred.

This superimposed overall stress collective is the reconstructed stress collective for the component, as mentioned above, for example for the component by means of which the time-normalized stress collectives per operating state ZBB were determined in the manner described above and shown in FIG. 1, and/or for a similar further component of a similar further overall system.

The particular advantage of this procedure is that a stress measurement does not have to be carried out again in the corresponding time range for the reconstruction of a stress collective. Based on this, the current damage status of a component can also be derived by an appropriate selection of reconstructed stress collectives. This requires a stress collective that corresponds to the stress to be endured over the entire service life of the component in the sense of a failure criterion. This can be determined, for example, by constructing a histogram for the occurrence of the operating states for the expected service life by extrapolating from a measurement, or by carrying out a measurement over a group of the same overall systems, for example over an entire vehicle fleet, within the scope of the expected service life and the individual histograms of all overall systems, for example all vehicles, are superimposed. By reconstruction with the time-related, i.e. time-normalized, stress collectives per operating state ZBB, a design collective for the component is determined from this histogram.

Furthermore, a histogram of the occurrence of the operating states over the entire service life of an overall system, for example a vehicle, can be determined. From the reconstruction of the stress collective on the basis of this histogram, the stress collective of the overall system, for example the vehicle, can be reconstructed up to the current point in time. By comparing this current reconstructed stress collective with the design collective, the current damage to the component can be determined in comparison to the design collective. A suitable method for this is the linear damage accumulation hypothesis according to Palmgren and Miner, for example in the "Miner-Elementary" modification.

Knowledge of a Wohler curve is a prerequisite for the applicability of this method for determining damage. This is either determined experimentally or estimated using suitable methods (e.g. according to FKM guideline). The linear damage accumulation calculation results in a respective damage sum for the reconstructed stress collective and the design collective, with the ratio of the two damage sums reflecting the current damage to the component, i.e. the current state of damage. Due to the permanent updating of the current reconstructed stress collective via the updating of the histogram of the occurrence of the operating states, online monitoring of the damage state of the component is possible.

The procedure described is an example for determining the damage to an equivalent amplitude collective as a stress collective based on the nominal stress concept or the notch stress concept of operational stability, but is not limited to these applications. The principle is based on the separate determination of the damage from the current reconstructed stress collective and design collective using a suitable method for determining the damage and the comparison of the damage obtained in this way.

As a further exemplary embodiment, the procedure for the modified stress analysis based on the notch strain concept is described below. In this case, only the specific implementation of method steps VS3 and VS4 differ from the procedure described above. In step VS3, the damaging events are determined in the form of load changes by means of rainflow classification. However, these are not stored in rainflow matrices as described above, but are converted into a stress characteristic value (here: damage parameter) in a step VS4 according to the notch strain concept of operational strength immediately after they have been recorded and/or taking into account the order in which they occur. The damage parameter determined in this way is added to the damage parameter collectives of the associated operating states according to the operating states involved in the associated load change (for example operating states associated with the reversal points of the load change), in particular proportionally, for example in each case as a damage parameter with 50% of the original frequency—i.e. 0.5. In this way, the stress collectives per operating state BB are obtained as damage parameter collectives per operating state.

In an alternative embodiment, the damage parameters are distributed among the operating states preferably according to the weighting described above, which is in particular energetically motivated.

The rest of the procedure is, at least essentially, analogous to the example above. The only difference here is partly the determination of damage. According to the notch strain concept, damage parameter Wohler lines corresponding to the damage parameter used are required instead of usual Wohler lines. The damage sum is determined analogously to the Miner rule.

The method can be carried out, for example, by means of a device which, for example, can be arranged directly to the overall system, i.e. onboard, or for example partly on the overall system and partly offboard, i.e. external with regard to the overall system. In the external with regard to the overall system case, the device includes in particular a processing unit, for example in the form of a computer. In the case of the device arranged completely on the overall system, the processing unit is, for example, a control unit or another computer unit. In the external with regard to the overall system case, the method can be carried out, for example, on the basis of externally recorded data, in particular time histories of the stress on the component under consideration and the signals of the overall system that are relevant for determining the operating states. For example, the device includes corresponding detection units on the overall system for this purpose, which transmit this data to an external unit, in particular to the processing unit, for recording and processing. Alternatively, this data can, for example, first be recorded in the overall system and later transmitted to the processing unit for evaluation. The data can be transmitted wirelessly, for example via radio, or by cable.

Such a device according to the invention is thus designed and set up to carry out the method.

The device comprises, for example, at least one unit for detecting the stresses on the component, at least one unit for detecting the signals S of the overall system that are relevant for determining operating states, and at least one processing unit. The processing unit is designed and set up in particular to carry out the above-mentioned method steps, in particular to process the detected stresses on the component and the signals S of the overall system that are relevant for determining operating states, in particular in the manner described above.

The device can, for example, as already mentioned, be arranged or arrangeable completely on the overall system or, for example, at least one component of the device, in particular the at least one unit for recording the stresses on the component and/or the at least one unit for recording the signals S relevant for the determination of the operating states of the overall system, is arranged or arrangeable on the overall system. The processing unit is then, for example, a component of the device that is external to the overall system, for example a computer.

REFERENCES

BB stress collectives per operating state
BSV stress over time history
BZV operating status over time history
DB duration of the operating states
EB damaging events per operating state
GB coupled stress analysis
S signals
ZBB time-normed stress collective per operating state
VS1 first process step
VS2 second process step
VS3 third process step
VS4 fourth process step
VS5 fifth process step

What is claimed is:

1. A method for determining a damage state of a component, the method being executed by a computer system comprising one or more processors, at least one memory, and a sensor system comprising one or more sensors configured to detect at least one of stresses and loads on the component during operation, the method comprising:
   determining damage states for the component as a function of operating states of an overall system comprising the component, by the sensor system recording a time profile of one of the stresses and loads on the component and a time profile of signals of the overall system relevant for determining operating states during operation of the overall system,
   from the recorded signals, determining at least one of the following: operating states of the overall system that have occurred and a time course of the operating states that have occurred,
   determining damaging events from the at least one of the recorded stresses and loads and assigning the damaging states to the operating states,
   determining at least one of stress collectives and load collectives per operating state, and determining at least one of time-normalized stress collectives and load collectives per operating state based on a duration of the respective operating state,
   the one or more processors using the at least one of time-normalized stress collectives and load collectives per operating state to perform at least one of the following steps:
   determining the damage state for the component as a function of operating states that have occurred in the overall system,
   determining a future damage state as a function of predicted future operating states of the overall system comprising the component,
   for a further component designed in the same way as the component, determining the state of damage as a function of operating states that have occurred in a further overall system comprising the further component and is designed in the same way as the overall system,
   determining the future state of damage as a function of predicted operating states of the further overall system comprising the further component;
   wherein damaging events are determined from at least one of the detected stresses and detected loads and assigned to the operating states and thus damaging events are determined per operating state, by carrying out at least one of a stress analysis and a load analysis;

wherein the step of carrying out at least one of a stress analysis and a load analysis comprises:

assigning at least one of each stress and each load an assigned operating state based on the signals of the overall system, carrying out a rainflow classification of the at least one of the stresses and loads to determine the occurrence of damaging events in the form of load changes, generating a separate rainflow matrix for each operating state in which counted load changes are distributed proportionally to the operating states involved in the occurrence of the load changes, for a consideration of a residual, dividing the respective load change according to a type of consideration among the rainflow matrices of the operating states involved.

2. The method according to claim 1,
wherein the signals of the overall system are divided into classes and, as a result, possible operating states are defined, in order to obtain a time history of the operating states which have occurred.

3. The method according to claim 2,
wherein the duration of the respective operating state is determined by forming a multidimensional histogram for the signals of the overall system with the classes into which the signals are divided, on the basis of which the duration of the respective operating state is determined.

4. The method according to claim 3,
wherein the forming of the multidimensional histogram takes place via a multi-parameter, related instantaneous value count.

5. The method according to claim 1, wherein the generating step comprises:
dividing the respective load change into two half load changes and storing them respectively in the rainflow matrices of the operating states belonging to reversal points, and wherein the dividing step for the consideration of the residual comprises:
dividing the respective load change into 50% each on the rainflow matrices of the operating states involved.

6. The method according to claim 1, wherein the generating step comprises:
dividing the respective load change in a weighted manner to the operating states involved in a formation of the respective load change and storing the divided load change accordingly in the rainflow matrices of these operating states,
and wherein the dividing step for the consideration of the residual comprises:
distributing the respective load change in a weighted manner based on the operating states involved in a creation of the respective load change to the rainflow matrices of the operating states involved.

7. The method according to claim 6,
wherein a weight of the respective operating state is determined by determining a period during which the respective load change occurred and a total duration of the respective operating state within the period, and the weight is the ratio of the total operating state duration of the respective operating state to the total duration of the respective load change.

8. The method according to claim 6,
wherein a weight of the respective operating state is determined as the ratio of the accumulated amounts of increments of the one of the stress and the load of the associated load changes in the respective operating state to a total increment of the at least one of the stress and load of the associated load changes,
wherein the total increment of the associated load changes is twice the difference between upper and lower stress or load measurement values of reversal points of the associated load changes.

9. The method according to claim 1,
wherein the at least one of the stress collectives and load collectives are determined for each operating state by evaluating the rainflow matrices individually for each operating state.

10. The method according to claim 1,
wherein the at least one of the time-normalized stress collectives and time-normalized load collectives are determined per operating state by normalizing the at least one of the stress collectives and load collectives per operating state in a frequency of individual collective stages to the duration of the associated operating state.

11. A device for determining a damage state of a component comprising at least one processing unit and one or more programs stored on the memory, the one or more programs when executed by the processing unit, cause the processing unit to carry out the method according to claim 1.

12. The device according to claim 11, comprising:
at least one unit for recording the at least one of the stresses and loads on the component, and
at least one unit for detecting the signals of the overall system that are relevant for determining operating states.

13. The device according to claim 11,
wherein one of the following conditions applies:
the device is arranged on the overall system,
at least one component of the device is arranged on the overall system.

14. The method according to claim 1, wherein the type of consideration takes into account whether there is no load change, a half load change or a complete load change, wherein the respective load change is divided proportionally among the rainflow matrices of the operating states involved.

15. A method for determining a damage state of a component, the method being executed by a computer system comprising one or more processors, at least one memory, and a sensor system comprising one or more sensors configured to detect at least one of stresses and loads on the component during operation, the method comprising:
determining damage states for the component as a function of operating states of an overall system comprising the component, by the sensor system recording a time profile of one of stresses and loads on the component and a time profile of signals of the overall system relevant for determining operating states during operation of the overall system,
from the recorded signals, determining at least one of the following: operating states of the overall system that have occurred and a time course of the operating states that have occurred,
determining damaging events from the at least one of the recorded stresses and loads and assigning the damaging states to the operating states,
determining at least one of stress collectives and load collectives per operating state, and determining at least one of time-normalized stress collectives and load collectives per operating state based on a duration of the respective operating state, the one or more processors using the at least one of time-normalized stress collectives and load collectives per operating state to perform at least one of the following steps:

determining the damage state for the component as a function of operating states that have occurred in the overall system, determining a future damage state as a function of predicted future operating states of the overall system comprising the component, for a further component designed in the same way as the component, determining the state of damage as a function of operating states that have occurred in a further overall system comprising the further component and is designed in the same way as the overall system, determining the future state of damage as a function of predicted operating states of the further overall system comprising the further component;

wherein damaging events are determined from at least one of the detected stresses and detected loads and assigned to the operating states and thus damaging events are determined per operating state, by carrying out at least one of a stress analysis and a load analysis;

wherein the step of carrying out at least one of a stress analysis and a load analysis comprises:

assigning at least one of each stress and each load an assigned operating state based on the signals of the overall system, carrying out a rainflow classification of the at least one of the stresses and loads to determine the occurrence of damaging events in the form of load changes, converting the determined load changes into a damage parameter at least one of
directly after determination of the load changes, and
taking into account an order of occurrence of the load changes, and adding the determined load changes as damage parameters to damage parameter collectives of the operating states involved in the associated load change, wherein the damage parameter collectives per operating state represent the at least one of the stress collectives and load collectives per operating state.

16. The method according to claim 15, wherein in the adding step:
the determined load changes are added as damage parameters with half an original frequency.

17. The method according to claim 13, wherein prior to the adding step:
dividing up each of the determined load changes as a damage parameter, weighted according to the operating states involved in a formation of each of the determined load changes.

18. The method according to claim 17,
wherein a weight of each operating condition is determined by determining a period during which the respective load change occurred, and a total duration of the respective operating state within this period, and by the weight resulting as the ratio of the total operating state duration of the respective operating state to the total duration of the respective load change.

19. The method according to claim 17,
wherein a weight of the respective operating state is determined as the ratio of accumulated amounts of increments of the at least one of the stress and load of the associated load changes in the respective operating state to a total increment of the at least one of stress and load of the associated load changes, wherein the total increment of the associated load changes is twice the difference between upper and lower measurement values of at least one of stress and load of reversal points of the associated load changes.

20. A device for determining a damage state of a component comprising at least one processing unit and one or more programs stored on the memory, the one or more programs when executed by the processing unit, cause the processing unit to carry out the method according to claim 15.

21. The device according to claim 20, comprising:
at least one unit for recording the at least one of the stresses and loads on the component, and
at least one unit for detecting the signals of the overall system that are relevant for determining operating states.

22. The device according to claim 20, wherein one of the following conditions applies:
the device is arranged on the overall system,
at least one component of the device is arranged on the overall system.

* * * * *